DEVICES FOR THE RECOGNITION OF PRINTED CHARACTERS

Filed Dec. 6, 1957 2 Sheets-Sheet 1

Inventor
Gordon George Scarrott,
By
Cameron, Kerkam & Sutton Attorneys

Inventor

Gordon George Scarrott,

By

Cameron, Kerkam & Sutton Attorneys 2,985,366
Patented May 23, 1961

2,985,366

DEVICES FOR THE RECOGNITION OF PRINTED CHARACTERS

Gordon George Scarrott, Manchester, England, assignor to Ferranti, Limited, Hollinwood, Lancashire, England, a company of Great Britain and Northern Ireland Filed Dec. 6, 1957, Ser. No. 701,215

Claims priority, application Great Britain Dec. 11, 1956

9 Claims. (Cl. 235—61.11)

This invention relates to devices for the recognition of printed characters of the kind in which a character printed on a document and which is to be recognised is compared with a series of master characters.

The expression "printed characters" should be understood as including characters formed in other ways, such as by stencil, typewriter, or teleprinter, than by actual printing in the narrow sense of the word. The essential feature of each character is that it consists of a combination of two components of different light value which will hereinafter be referred to for convenience as the "dark" and the "bright" components. Each component may consist of more than one part. For example, the numeral 0 when printed in black on white paper has a "dark" component of one part in the form of a black ellipse and a "bright" component in two parts—the white oval within the ellipse and the white surround outside it. Where on the other hand that numeral is printed white on dark paper what was previously the bright component of two parts is now the dark component of two parts, the previous dark component of one part being now the bright component of one part. The numeral 8, printed in black, clearly has a dark component of one part and a bright component of three parts.

Such devices have obvious uses in the field of document processing, particularly for providing the inputs for computers and business machines, for example for reading into such machines the figures on cheques, invoices, and other documents. It should however be understood that the invention is not limited to such applications.

It is possible to put more information on a document by means of printing than by means of punched holes, and devices of the kind described, provided they operate with sufficient speed, have important advantages over machines which operate upon punched cards.

Devices of this kind are known in which bright images of master characters are successively projected upon the dark component of a printed character to be recognised, with the result that when this component and the bright image coincide no light is reflected from the bright component of the printed character. Such coincidence can be made to indicate the nature of the unknown character. An arrangement of this kind has the disadvantage that the bright image may fall wholly within the dark component despite being the image of a different character—for example, the bright image of the letter I may fall on one of the vertical strokes of a printed letter N—and so give a false indication of coincidence.

Apart from the fact that the character to be recognised is unknown, its position upon the document which is being read is uncertain because of printing tolerances. It has been proposed to search for the printed character by moving the document bearing it in two directions which are normal to each other so that all possible positions for the character are covered by the bright images of the master characters. It is however desirable that the reading operation should be continuous and that movement of the document should be in one direction only.

A further disadvantage of previous devices is that they read more information from a printed character than is strictly necessary for its recognition. For example, the recognition of "3" from "5" does not depend upon recognition of the horizontal strokes and the loops, but only upon the difference between the sloping and vertical strokes. A device which gives low importance to information of low significance and high importance to information of high significance would be capable of faster and more certain operation than a device which reads the whole of the character.

An object of the present invention is to provide a device for the recognition of printed characters which is more reliable than those previously known.

A further object is to provide such a device which is capable of continuous operation.

Another object is to provide such a device which will operate at a greater speed than previously known devices of the kind.

According to the invention a device for the recognition of printed characters composed of comparatively dark and bright components includes an array of master characters of like configuration to said printed characters, optical arrangements for superimposing upon each of said master characters an image of a printed character to be recognised, photo-responsive devices for deriving electrical signals dependent on the extents of registration of the dark and of the bright components of said printed character on the one hand with the corresponding components, respectively, of the master character, and output means operable by said signals when representing that a master character matches said printed character to deliver an output signal representing that master character.

The said corresponding components of each master character may be distinguished from one another by having different light-responsive characteristics within a predetermined area individual to that character, one of said photo-responsive devices is arranged to derive a first signal in response to light from only the dark component of a master character, and two other of said photo-responsive devices are arranged to derive second and third signals in response to light from only the bright component of a master character within the said predetermined area individual to that character, said second signal being in dependence on the amount of light arising from the extent of registration of the bright component of the printed character with the bright component of a master character, said third signal being in dependence on the amount of light arising from the direct illumination of said bright component of a master character, and said output means being arranged to operate as aforesaid when the first signal is zero and the second signal is a predetermined proportion of the third signal.

Each master character may be masked to differing degrees of transparency so that the amount of light passing to said photo-responsive devices from each elemental portion is in direct dependence on the significance of that elemental area in distinguishing that master character from the other master characters.

By "the corresponding components" of each master character is meant the components having the same configurations respectively, rather than the same light values respectively, as those of the dark and bright components of the printed character. These components of each master character will hereinafter be referred to for convenience as the "dark" and the "bright" components of the master character, these expressions being merely labels having no optical significance.

By "matches" is meant that the image of either component of the printed character coincides substantially exactly with, in other words fills the same spaces as, the corresponding component of the master character, Clearly, if two such corresponding components coincide, the other two must coincide also.

By "registration" is meant superimposition without necessarily matching.

The above expressions when used hereinafter in the specification and claims should be understood as having the meanings defined.

In the accompanying drawings.

Figure 1:
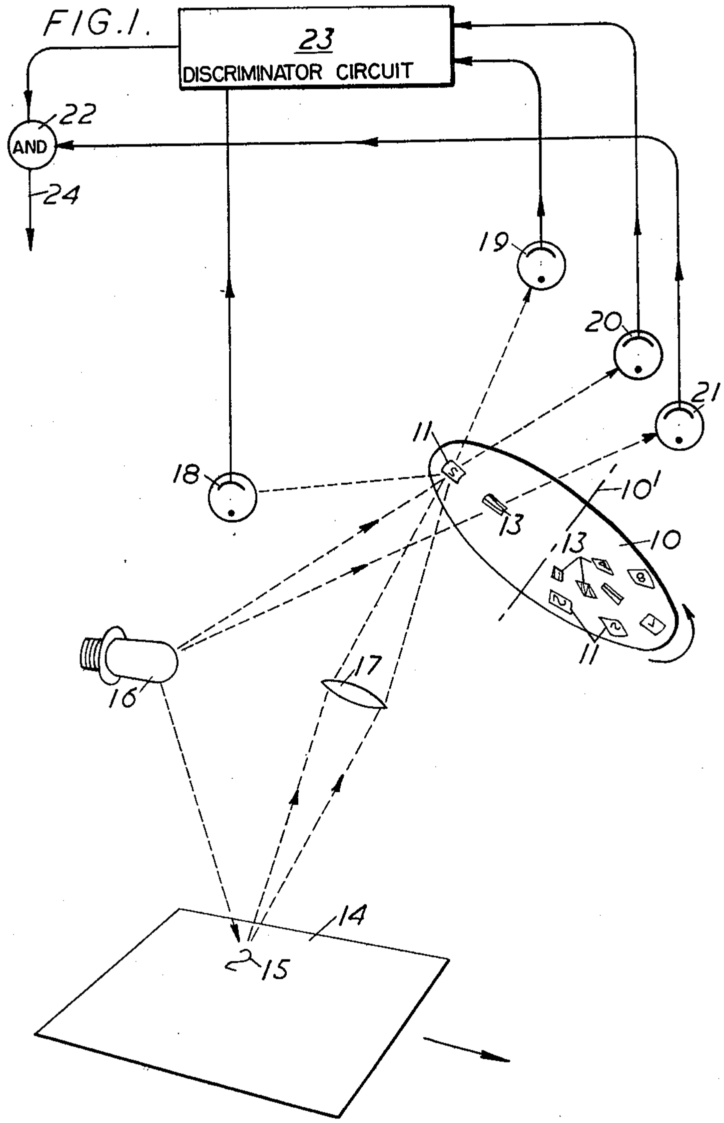
Figure 1 is a schematic diagram of one embodiment of the invention.

An embodiment of the invention will now be described by way of example with reference to Figure 1.

A device for the recognition of printed characters includes an opaque disc 10 carrying a series of transparent areas or windows, some of which are shown at 11, carrying an array of master characters of like configuration to the printed characters to be recognised. A further series of windows 13, the purpose of which will be described later, carry code equivalents of the master characters expressed in some optical characteristic, such as the degree of transparency. The disc is arranged to rotate in the direction of the arrow about the axis $10^1$ normal to its plane.

A document 14 carries a series of characters to be recognised printed in black on white paper. One of these—the numeral 2—is shown at 15. From the above definitions the "dark" component of this character is the figure itself, indicated at $15^1$ in Fig. 2, and the bright component is the surround $15^{11}$. The dark component of the master signal—that is, the component corresponding to the figure $15^1$—is made of opaque reflecting material and so has a light-reflective response characteristic. The bright component of the master signal is the transparent part of the window, over the predetermined area delimited by the window frame, and so has a light-transmitting response characteristic.

Arrangements are made for moving the document steadily in a direction normal to the axis $10^1$ about which the disc rotates and for illuminating both the document and one side of the disc by a light source 16. Optical arrangements in the form of a lens 17 are provided for superimposing an image of each printed character in turn upon the windows bearing the master characters on the disc so that as the disc rotates the image of the printed character is successively projected into registration with each master character.

Photocell 18 is arranged to respond to the light reflected from each master character and hence derives a signal (the "first" signal above referred to) in response to light from only the dark component of each master character, this signal being clearly dependent on, being in fact inversely proportional to, the extent of registration of the dark component of a printed character with the dark component of each master character.

Photocell 19 is responsive to the light transmitted through each window 11 from the document 14 and hence derives a "second" signal in dependence on the amount of light arising from the extent of registration of the bright component of each printed character and the bright component of each master character as delimited by the window frame.

Photocell 20 is responsive to the light transmitted through each window 11 from the light source 16 and hence derives a "third" signal in dependence on the amount of light arising from the direct illumination of the bright component of each master character as delimited by the window frame.

Photocell 21 is arranged to respond to light transmitted through each window 13 from the light source 16. As already stated, the windows 13 carry equivalents of the master characters as coded in, say, the degree of transparency and the output signal from cell 21 is an electrical signal corresponding to the master character which is at any time being scanned by the image of the printed character and is passed to a gating circuit 22, which is normally closed.

The signals from cells 18, 19, and 20 are passed to a discriminating circuit 23, which has characteristics such that when the first signal (from cell 18) is zero and the second and third signals (from cells 19 and 20) equal each other a signal is passed to gate 22 to open the gate and to allow the concurrent signal from cell 21 to pass to the output line 24.

It will be understood from the foregoing description that each of cells 18, 19, 20 and 21 is a photoelectric cell of conventional construction arranged to respond to, and derive an electrical signal in dependence on the amount of, light from a specific source, and that gating circuit 22 is a common kind of normally closed, two-entry AND gate which passes a signal only when both of its inputs are energized. Discriminating circuit 23 may be built up from various arrangements of well-known computer stages capable of functioning in the manner above described, one obvious form of such a circuit comprising (*a*) a differential amplifier which receives the outputs from cells 19 and 20 and itself supplies a zero output when and only when the signals from cells 19 and 20 are equal, (*b*) an amplitude discriminator which receives the output from the amplifier *a* and itself supplies an output when and only when the amplifier output is zero, and (*c*) a NOT gate which passes the output from stage *b* when and only when the signal from cell 18 is zero.

In operation, the document to be read is passed under lens 17 and light source 16, and images of the characters thereon are projected in turn into registration with the master characters on the disc.

Whenever the dark component of a printed character does not wholly cover the dark component of a master character some portion of the latter component is illuminated by light from the bright component of the printed character and this light is reflected to cell 18, with the result that the first signal is not zero and gate 22 remains closed and so does not pass the signal from cell 21 to the output line. Similarly when the bright component of a printed character does not wholly cover the bright component of a master character, some portion of the dark component of the printed character obscures the bright—that is, the transparent—component of the master character and less light falls upon cell 19 than on cell 20. Hence again the gate remains closed.

It will be appreciated that cell 18 cannot detect exact coincidence of the dark components; the zero signal from this cell merely indicates that the dark component of the master character is wholly covered by the image of the dark component of the printed character. Similarly the quantity of the signals from cells 19 and 20 merely indicates that the bright component of the master character is fully covered by that of the printed character. It is only when both cell 18 on the one hand and cells 19 and 20 on the other hand derive these signals that an indication is given that a master character matches the printed character. Discriminator 23 now produces a control signal to open gate 22, which passes the signal produced by cell 21 to the output line 24.

The rotation of disc 10 carries the master characters in a direction normal to the movement of the document 14 and if the speed of rotation and the speed of the document are in the correct ratio the device will search for a character and will recognise it in whatever position it may take up on a line of print—including positions normal to the line—on the document.

Because the device in accordance with the invention checks the coincidence with the master character of both the dark and the bright components of the printed character considerable reliability is attained, above that of devices as hitherto known. Further advantages are the continuity of operation—a steady movement of the document and a steady rotation of the master disc—and a speed of operation above that of known devices.

A still greater speed may be obtained by arranging for the document to be so printed that each printed character when in the reading position occupies a predetermined space restricted both in the direction of the line and in the direction normal to it. The search for each character can then be restricted to the "possible" positions along the line and normal to it, thereby saving the time that would otherwise be spent searching "impossible" positions.

A modified form of the arrangement of Fig. 1 to provide increased speed in this manner without requiring any non-uniform mechanical motion will now be described with reference to Fig. 3.

Considering first the scanning along the direction of the line, it is assumed that the character 15 is so printed as to fall only within the range 31 and can never fall to any extent in the bounding range 32 or 33. A glass block 34 of shallow rectangular form is introduced in the light path from the printed character to the master disc 10 and rotated (by means not shown) in the direction indicated by the arrow about a longitudinal axis normal to that of disc 10 and to the direction of movement of the document. The effect of this is to produce an image at each master character which at the correct speed of rotation of the block is substantially stationary, despite the steady movement of the document, throughout the movement of character 15 over the range 31. Whilst the character is passing through range 32 or 33 the block is turning through its edge-on range and no image reaches the master character. As the image, as projected on each master character, is thus almost stationary for an appreciable period the document can be moved at a considerably increased speed whilst still allowing time to compare each printed character with each master character.

The speed of rotation of disc 10 and hence the speed of the scan in directions normal to the line of movement may be similarly increased by substituting for the original single lens 17 of the Fig. 1 arrangement a lens disc 35 secured to disc 10 and carrying a separate lens for each master character, the diameter and location of disc 35 being such that the optic axis of each lens is aligned on the master character individual to it and on the centre of the "reading" position of each printed character. The effect is again that the image of each printed character, as projected on each master character, is approximately stationary whilst the possible positions of the printed character in directions normal to the line are searched by the rotation of disc 10, which rotation, as already indicated, may for this reason be effected at a considerably increased speed.

Some pairs of master and printed characters being compared at any one time such as "3" and "5" do not differ so much as other pairs such as "0" and "1." It follows that a device as described would require a more sensitive adjustment of the discriminator to distinguish the similar pairs than that required for other pairs of characters. This difficulty may be overcome to a considerable extent by providing each master character with a mask whose transparency over any elemental portion is a suitable function of the information conveyed by that portion. Thus, the mask, say, for a master "3" is most transparent in places where "3" differs from most of the other characters because information transmitted by that portion of the mask is of much greater significance than that transmitted by a portion of the mask in places where "3" has something in common with a number of other characters.

An example of such a mask will now be described with reference to Fig. 4. It will be appreciated that the mask is designed to fit over both components of the master character 2, and to simplify the explanation it will be assumed that it is only necessary to distinguish this character from a 4 and a 7.

Figures 2, 3, 4:
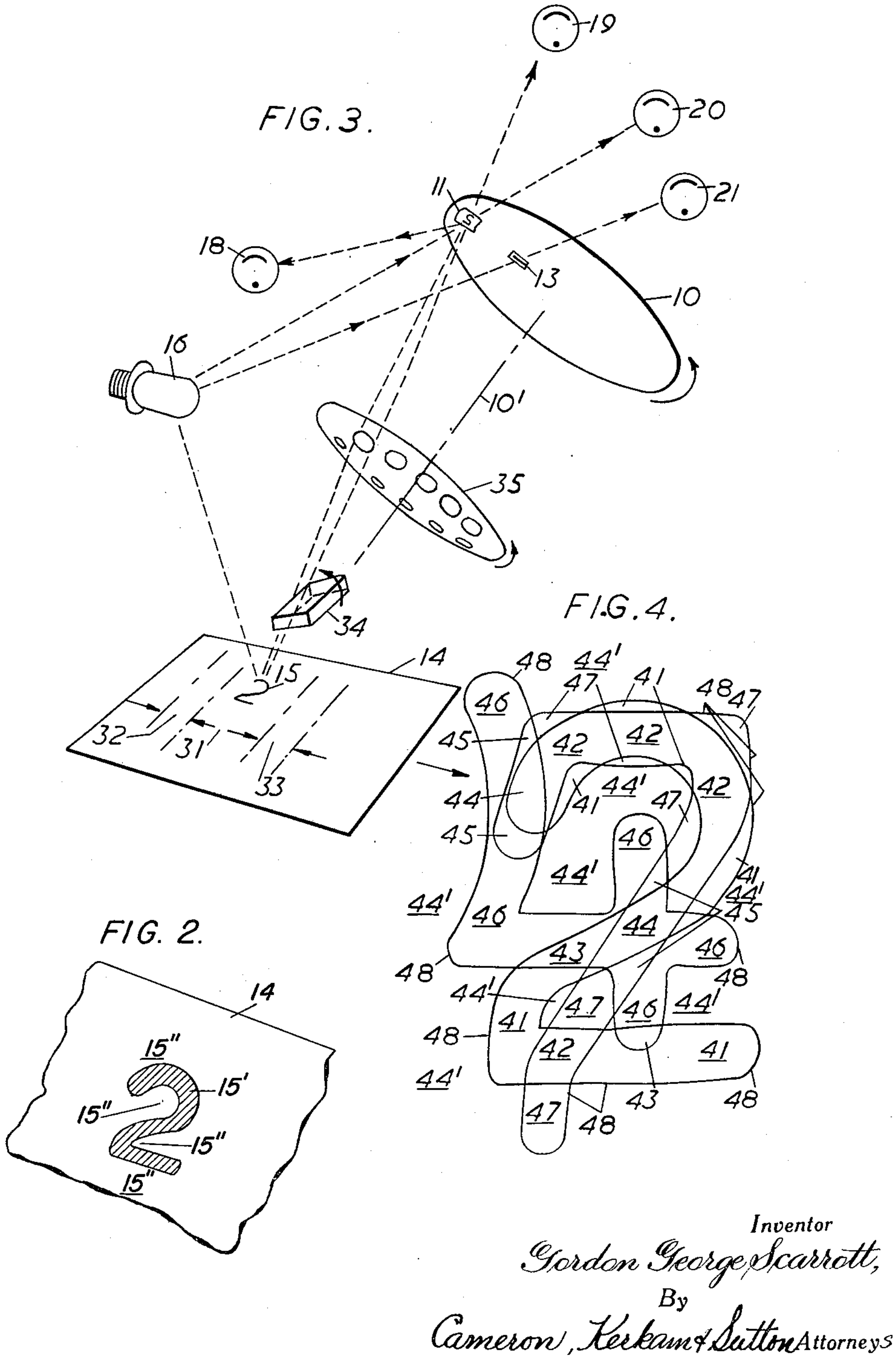
Figure 2 shows a part of Figure 1 to an enlarged scale.
Figure 3 shows a part of Figure 1 modified in accordance with another embodiment.
Figure 4 shows a part of Figure 1 or Figure 3 to an enlarged scale, in accordance with another embodiment.

Considering first the actual figures themselves, as distinct from their surrounds, the mask is fully transparent over only those portions 41 of the figure 2 which do not coincide with either the 4 or the 7, and which therefore supply most information. Over those portions 42 of the 2 which coincide with the 7 but not with the 4 and which therefore supply less information the mask is transparent to a degree that will be indicated later. Similarly with those portions 43 of the 2 which coincide with the 4 but not with the 7. Over those portions 44 of the 2 which coincide with both the 4 and the 7 and which therefore supply no information the mask is fully opaque.

Similarly with the surround. Over those portions 44[1] which are common to all three figures and which accordingly supply no information the mask is fully opaque. Over such portions 45 of the surround of the 2 which do not coincide with portions of the surrounds of either the 4 or the 7 the mask is fully transparent. And over portions 46 and 47 where the surround of the 2 does not coincide with that of the 4 and the 7, respectively, the mask has a reduced degree of transparence.

The relative degree of transparency of such portions 42 and 43 of the actual figure is inversely proportional to their respective areas (the greater the area the less the transparency) so that the total amount of light passed through or reflected by those portions of the master character are approximately equal; similarly with the portions 46 and 47 of the surround.

It will be appreciated that with such a mask the "frame" of the window which contains the master character and delimits the predetermined area above mentioned is merely the outermost boundary 48 of the composite figures, since outside this boundary the mask is wholly opaque, all this outer portion of surround being common to all three figures and therefore giving no information.

The mask is designed on the above principles whichever component of the master character is light-reflecting or light-transmitting, and which ever portion of the printed character is dark or bright.

It will also be appreciated that with such a mask the amount of light passing to the approximate photocells from each elemental portion of the predetermined area is in direct dependence on the significance of that elemental portion in distinguishing that master character from the other master characters. Hence the use of such a mask ensures that the ouput from cell 18 is as remote as possible from zero, and the difference between the outputs from cells 19 and 20 is as great as possible, whenever a printed character does not match a master character, even when the printed character is to some extent defaced or the document has random marks on it.

Various photographic techniques are available for deriving the masks by making prints from superimposed transparencies bearing shadow images of the respective characters.

Various details of the above-described embodiments may be varied within the scope of the invention. The differing light-responsive characteristics which distinguish the two components of a master character may be other than light-reflecting and light-transmitting; they may for example be both light-transmitting but of different refractive index, cell 18 being in this case behind the disc. The essential requirement is that the light from the two components may pass without mutual interference to the respective photocells. Hence in another alternative each component is light transmitting with the same refractive index but of different colours, appropriate colour filters or other means being provided to ensure that photocell 18 receives light from only the dark component of the master characetr whereas cells 19 and 20 receive light from only the bright component.

As already indicated, the printed characters may be bright on a dark background, as well as dark on a bright background.

Where the bright component of a printed character is other than white, the light received by cell 19 may not equal that received by cell 20 even when the printed and master characters are matched. In such a case discriminator 23 may be modified to derive a gate-opening signal from these two cells when the light received by cell 19 is a predetermined proportion of, rather than is equal to, the light received by cell 20.

Instead of being common to the array of master characters, the equivalent of cells 18 to 20 may be provided for each character individually, the array being then in the form of a matrix of master characters and their associated photocells. An advantage of this arrangement is that an image from each printed character may be projected into registration with each master character simultaneously, and time therefore saved.

It has been found that in some cases it is necessary to increase the contrast between the printed characters and the document. This may be effected by the use of a low-definition television link between the document and the device. Alternatively the printed character may be printed in a fluorescent ink and the light source may be ultra-violet, filters being interposed where necessary to keep ultra-violet light from the photocells and to transmit only the light produced by the fluorescence.

It will be appreciated that recognition may be considerably facilitated by the use of a type-face specially designed for the purpose.

What I claim is:

1. A device for the recognition of printed characters composed of comparatively dark and bright components including a single array of master characters of like configuration to said printed characters, each master character having comparatively dark and bright components corresponding to those of one of said printed characters, optical means for superimposing upon a master character a single image of a printed character to be recognised, a plurality of photo-responsive devices associated with said master character for deriving simultaneous electrical signals dependent on the extents of registration of the dark and of the bright components of said printed character on the one hand with the corresponding components, respectively, of said master character, and output means electrically connected to said photo-responsive devices and operable by said signals to deliver an output signal representing said master character when said master character matches said printed character.

2. A device for the recognition of printed characters composed of comparatively dark and bright components including an array of master characters of like configuration to said printed characters, each master character having comparatively dark and bright components corresponding to those of one of said printed characters and being distinguished from one another by having different light-responsive characteristics within a predetermined area individual to that character, optical means for superimposing upon a master character an image of a printed character to be recognised, a plurality of photo-responsive devices for deriving simultaneous electrical signals dependent on the extents of registration of the dark and of the bright components of said printed character on the one hand with the corresponding components, respectively, of said master character, one of said photo-responsive devices being so located relative to said master character and to said optical means as to derive a first signal in response to light from the dark component only of said master character, and two other of said photo-responsive devices being so located relative to said master character and to said optical means as to derive second and third signals in response to light from the bright component only of said master character within the said predetermined area individual to that character, said second signal being in dependence on the amount of light arising from the extent of registration of the bright component of the printed character with the bright component of said master character, said third signal being in dependence on the amount of light arising from the direct illumination of said bright component of said master character, and output means electrically connected to said photo-responsive devices and operable by said first, second and third signals to deliver an output signal representing said master character when the first signal is zero and the second signal is a predetermined proportion of the third signal.

3. A device as claimed in claim 2 including means for masking the dark and the bright components of each master character to differing degrees of transparency so that the amount of light passing to said photo-responsive devices from each elemental portion of a master character is in direct dependence on the significance of that elemental area in distinguishing that master character from the other master characters.

4. A device as claimed in claim 2 wherein the dark and the bright components of each master character are distinguished from one another by being light-reflecting and light-transmitting, respectively.

5. A device as claimed in claim 2 wherein said plurality of photo-responsive devices is common to the array of master characters, and said optical means are so constructed and arranged as to project an image of a printed character into registration with each master character in succession.

6. A device as claimed in claim 5 including a disc rotatable about an axis normal to the plane thereof and having said array of master characters mounted thereon, and wherein the printed characters to be recognised are movable along a line normal to said axis at a speed relative to that of the disc rotation such that all possible positions of a printed character are searched by each master character.

7. A device as claimed in claim 6 including means associated with each master character on said disc constituting a code equivalent of said character expressed in an optical characteristic, and wherein said output means include means for deriving a signal dependent on said optical characteristic when the image of a printed character is projected into registration with the master character associated with said code equivalent.

8. A device as claimed in claim 6 wherein the printed characters to be recognised are so printed that each occupies a predetermined space restricted in one direction relative to the line along which said characters are movable, and said optical means include means for maintaining the projected image of each printed character substantially stationary whilst said character occupies any part of said space, thereby allowing rapid and continuous movement of the printed characters and rotation of said disc.

9. A device as claimed in claim 8 wherein said last named means include a transparent rectangular glass block rotatable in the light path from a printed character to a master character about a longitudinal axis normal to the axis of said disc and to the line along which the printed characters are movable.

References Cited in the file of this patent

UNITED STATES PATENTS

| | | |
|---|---|---|
| 2,211,320 | Efron | Aug 13, 1940 |
| 2,682,043 | Fitch | June 22, 1954 |
| 2,919,425 | Ress et al. | Dec. 29, 1959 |
| 2,933,246 | Rabinow | Apr. 19, 1960 |